(12) United States Patent
Miller et al.

(10) Patent No.: US 6,305,525 B1
(45) Date of Patent: Oct. 23, 2001

(54) PRESSURELESS INFEED CONVEYOR TABLE

(75) Inventors: Terrance D. Miller, Bella Vista; William E. Salley, Bentonville; Ken S. Layton, Fayetteville, all of AR (US)

(73) Assignee: Delta Systems, Inc., Rogers, AR (US)

( * ) Notice: Subject to any disclaimer, the term of this patent is extended or adjusted under 35 U.S.C. 154(b) by 0 days.

(21) Appl. No.: 09/428,287

(22) Filed: Oct. 27, 1999

(51) Int. Cl.$^7$ ................................................ B65G 43/00
(52) U.S. Cl. ........................................................ 198/460.2
(58) Field of Search ........................................ 198/460.2

(56) References Cited

U.S. PATENT DOCUMENTS

| | | | |
|---|---|---|---|
| 3,133,386 | * | 5/1964 | Johnston ................................... 53/26 |
| 3,370,693 | * | 2/1968 | Marsden ................................... 198/34 |
| 4,004,678 | | 1/1977 | Hardy . |
| 4,149,626 | | 4/1979 | Holt . |
| 4,182,443 | | 1/1980 | Pongracz . |
| 4,360,098 | | 11/1982 | Nordstrom . |
| 4,604,704 | | 8/1986 | Eaves et al. . |
| 4,609,095 | | 9/1986 | Lenherr et al. . |
| 4,881,635 | | 11/1989 | Raschke . |
| 4,883,163 | | 11/1989 | Gamberini et al. . |
| 4,921,092 | | 5/1990 | Crawford et al. . |
| 5,070,995 | | 12/1991 | Schaffer et al. . |
| 5,082,103 | | 1/1992 | Ross et al. . |
| 5,191,965 | * | 3/1993 | Scheid ................................... 198/460 |
| 5,322,154 | | 6/1994 | Lenherr . |
| 5,513,740 | | 5/1996 | Affeldt et al. . |
| 5,547,004 | * | 8/1996 | Fransen ................................... 198/460.2 |
| 5,651,446 | | 7/1997 | Affeldt et al. . |
| 5,730,274 | | 3/1998 | Loomer . |
| 5,738,202 | | 4/1998 | Ydoateet . |
| 5,865,291 | | 2/1999 | Affeldt et al. . |
| 5,868,657 | | 2/1999 | Simmons . |
| 5,904,236 | | 5/1999 | Affeldt et al. . |
| 5,906,265 | | 5/1999 | Spatafora . |

* cited by examiner

*Primary Examiner*—Christopher P. Ellis
*Assistant Examiner*—Joe Dillon, Jr.
(74) *Attorney, Agent, or Firm*—Boyd D. Cox

(57) ABSTRACT

A pressureless infeed conveyor table for forming a predetermined spacing between articles on a conveyor in order to create a uniform column for a packaging process comprises reciprocating carriages that are driven directly by a reversible servo-motor. By directly driving the carriages, the weight of the accompanying sprocket assembly is decreased and the speed at which the carriages move is increased to improve efficiency and processing time.

20 Claims, 3 Drawing Sheets

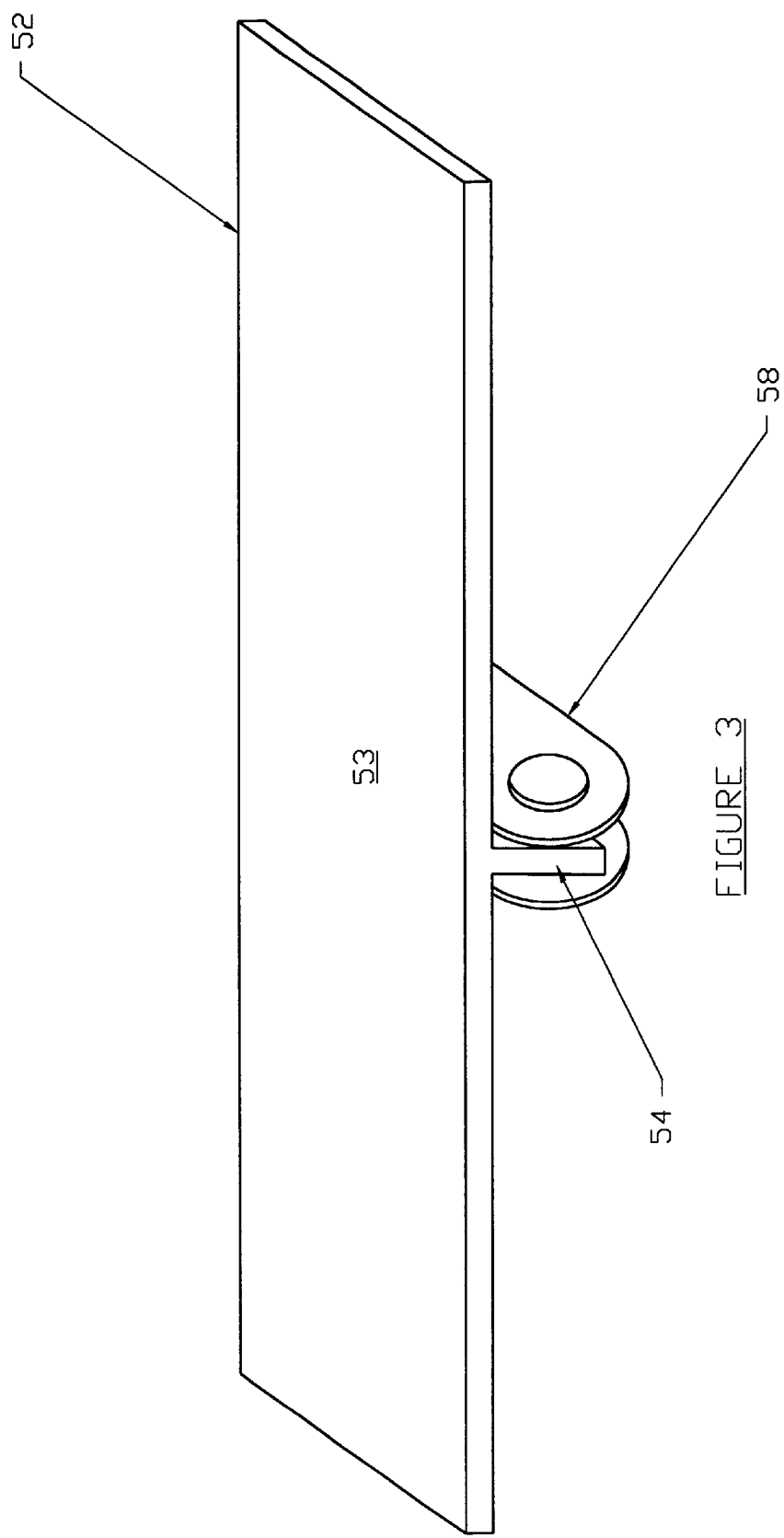

PRESSURELESS INFEED CONVEYOR TABLE

BACKGROUND

The present invention is directed to a pressureless infeed conveyor table for use with a control means for forming predetermined spaces between articles on a conveyor line in order to create a uniform column for further processing, particularly in a packaging process. The pressureless infeed conveyor table has a direct drive means for moving the first carriage which reduces stress on the sprocket assembly, thereby lessening the amount of mass required to comprise the sprocket assembly. The lightweight sprocket assembly allows an increase in the speed and efficiency at which the carriage can reciprocate, resulting in increased production speed.

In an automated packaging process, it is desirable to arrange the articles on the infeed conveying line in a uniform column with a predetermined spacing between them. However, there is a tendency for the articles to be positioned at irregular intervals along the conveyor.

If the articles being processed are sticky, the problem is compounded where even the slightest irregular spacing can cause unwanted article accumulations to occur on the conveyor. These accumulations can require that the conveying line be shut down to correct the problem. These shutdowns increase production time and production costs, as well. Consequently, there is a need for an infeed conveyor table that can quickly and efficiently form articles on a conveyor line into a uniform column having a predetermined spacing.

It is known that a predetermined distance can be created between articles moving in a column by simultaneously changing the effective lengths of a supply belt and a downstream removal belt as each article moves from the former to the latter. The effective lengths of the belts are varied by reciprocating carriages which are moved back and forth by a sprocket assembly driven by a servomotor.

The sprocket assembly must be strong enough to overcome the inertial forces created by the weight of the carriages as well as the weight of the assembly itself in order to move. Consequently, the sprocket assemblies of the prior art are of a large mass and weight. The speed of the carriages is dependent on the speed at which the sprocket assembly can be driven. A heavy sprocket assembly, such as required by the prior art infeed devices, is cumbersome and is forced to move at a slower rate of speed. Therefore, the speed of the carriage is reduced and the resultant operating speed of the infeed device is diminished by the weight of the sprocket assembly in the prior art devices.

For the foregoing reasons, there is a need for a pressureless infeed conveyor table having a direct drive means for the reciprocating carriages in order to provide a faster and more efficient device for use in a system which spaces articles in a uniform column with predetermined distance between the articles.

SUMMARY

The present invention is directed to a device that satisfies the need for a faster and more efficient pressureless infeed conveyor table for use in a conveying line to form a predetermined spacing between the conveyed articles.

In a preferred embodiment, an endless supply belt, trained about a plurality of supply belt rollers, is positioned upstream from an endless removal belt which is trained about a plurality of removal belt rollers. At least one of the supply belt rollers and at least one of the removal belt rollers is mounted on a first carriage that moves back and forth. A second reciprocating carriage also includes a supply belt roller and a removal belt roller mounted thereon.

The effective lengths of the belts are varied by moving the first and second carriages. By varying the effective lengths of the upper reaches of the supply and removal belts, a predetermined distance is established between a leading article and a trailing article as the articles move from the supply belt onto the removal belt.

The first carriage is driven by a carriage drive means which includes a reversible servo-motor and a carriage drive belt trained about rollers. The first carriage is directly attached to the carriage drive belt which is driven by the reversible servo-motor with the rollers.

The first and second carriages are interconnected by a sprocket belt which freely rotates about sprocket wheels. Since the sprocket belt is attached to the first and second carriages, it moves in concert with the carriages.

A plurality of support blocks are attached to and extend outwardly from the sprocket belt. These support blocks inhibit undesired oscillations in the endless supply and removal belts.

It is an object of the present invention to provide a pressureless infeed conveyor table which allows an increase in the rate of speed at which the carriages can be driven.

It is a further object of the present invention to provide an infeed conveyor table that operates more efficiently to increase article processing speed.

It is a further object of the present invention to increase the speed and efficiency of a pressureless infeed system for packaging processes.

It is a further object of the present invention to increase the efficiency of an infeed system by providing a pressureless infeed conveyor table that allows the reciprocating carriages to move at higher speeds by reducing the mass of the sprocket assembly.

It is a further object of the present invention to provide a direct drive means for moving the reciprocating carriages on a pressureless infeed conveyor table.

It is a further object of the present invention to provide an infeed conveyor table that reduces the inertial force required to move the sprocket assembly.

It is a further object of the present invention to provide a pressureless infeed conveyor table that reduces wear and tear on the sprocket assembly.

It is a further object of the present invention to provide a pressureless infeed conveyor table that reduces the amount of required service and maintenance.

It is a further object of the present invention to provide a pressureless infeed conveyor table that detects the conveyed articles at a significant distance upstream from the transfer location between the endless supply belt and the endless removal belt.

It is a further object of the present invention to provide a pressureless infeed conveyor table having a sprocket assembly which is driven by one of the carriages.

In a preferred embodiment of the present invention the drive system used to move the carriages creates a low force loading on the sprocket assembly during the reciprocating action of the carriages. The upper carriage is driven directly, while the sprocket belt and lower carriage merely track with the movement of the upper carriage. With the low force load, wear and tear on the sprocket assembly is reduced.

With less stress on the sprocket belt and sprocket rollers, they are of a reduced size and mass, thereby decreasing the weight of the sprocket assembly. It can be appreciated that by decreasing the weight, size and mass of the sprocket assembly, the starting and stopping speeds of the sprocket assembly are enhanced, and the speed at which the carriages can move is increased.

BRIEF DESCRIPTION OF DRAWINGS

Reference is made to the accompanying drawings in which are shown illustrative embodiments of the invention and from which novel features and advantages will be apparent.

FIG. 3 is a top perspective view of a support block attached to a link taken from the sprocket belt of the preferred embodiment of FIG. 1.

DETAILED DESCRIPTION

The present invention is a pressureless infeed conveyor table used in a conveying line for processing articles. The pressureless infeed conveyor table is for use in an automated process in which a controller (90) regulates the movements of the elements comprising the table.

Figure 1:
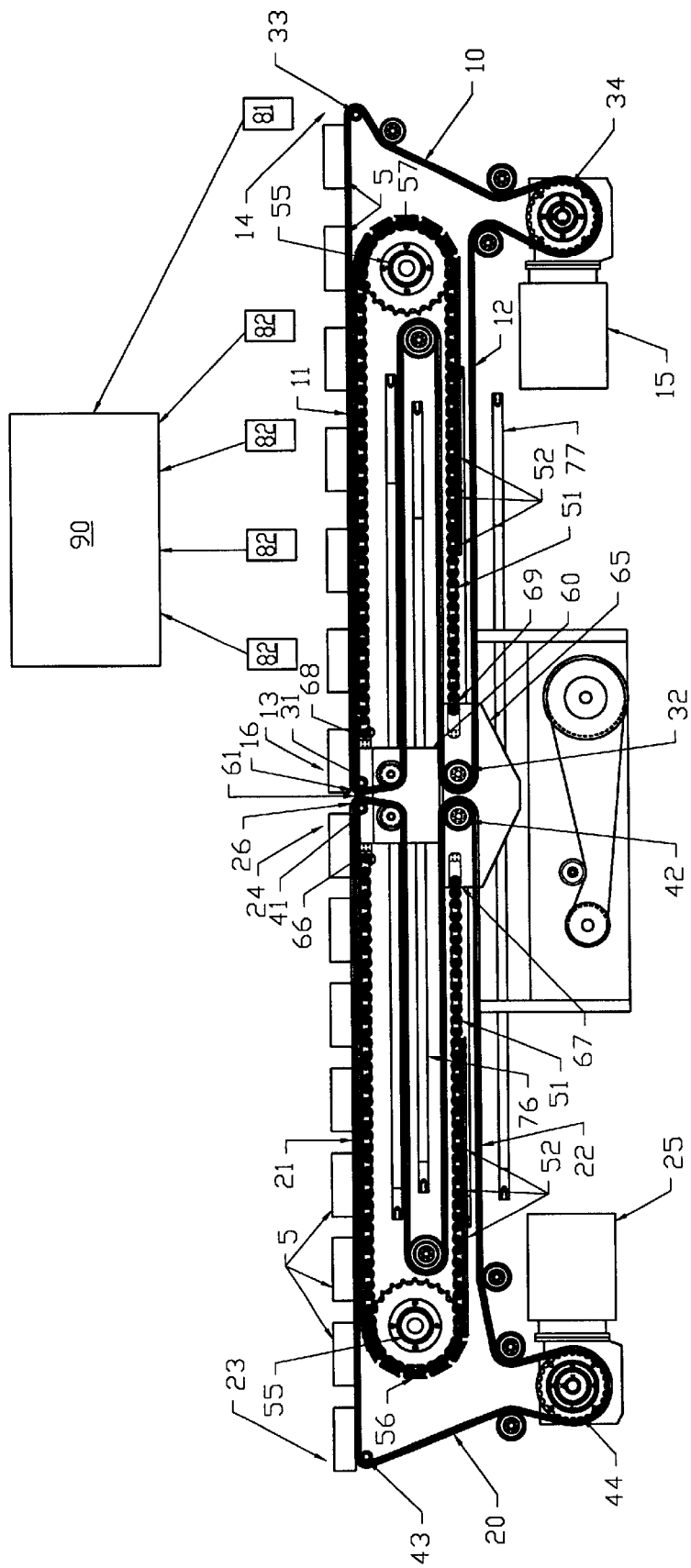
FIG. 1 is a schematic front side elevational view with block diagram, of a preferred embodiment of the pressureless infeed table of the present invention.
Figure 2:
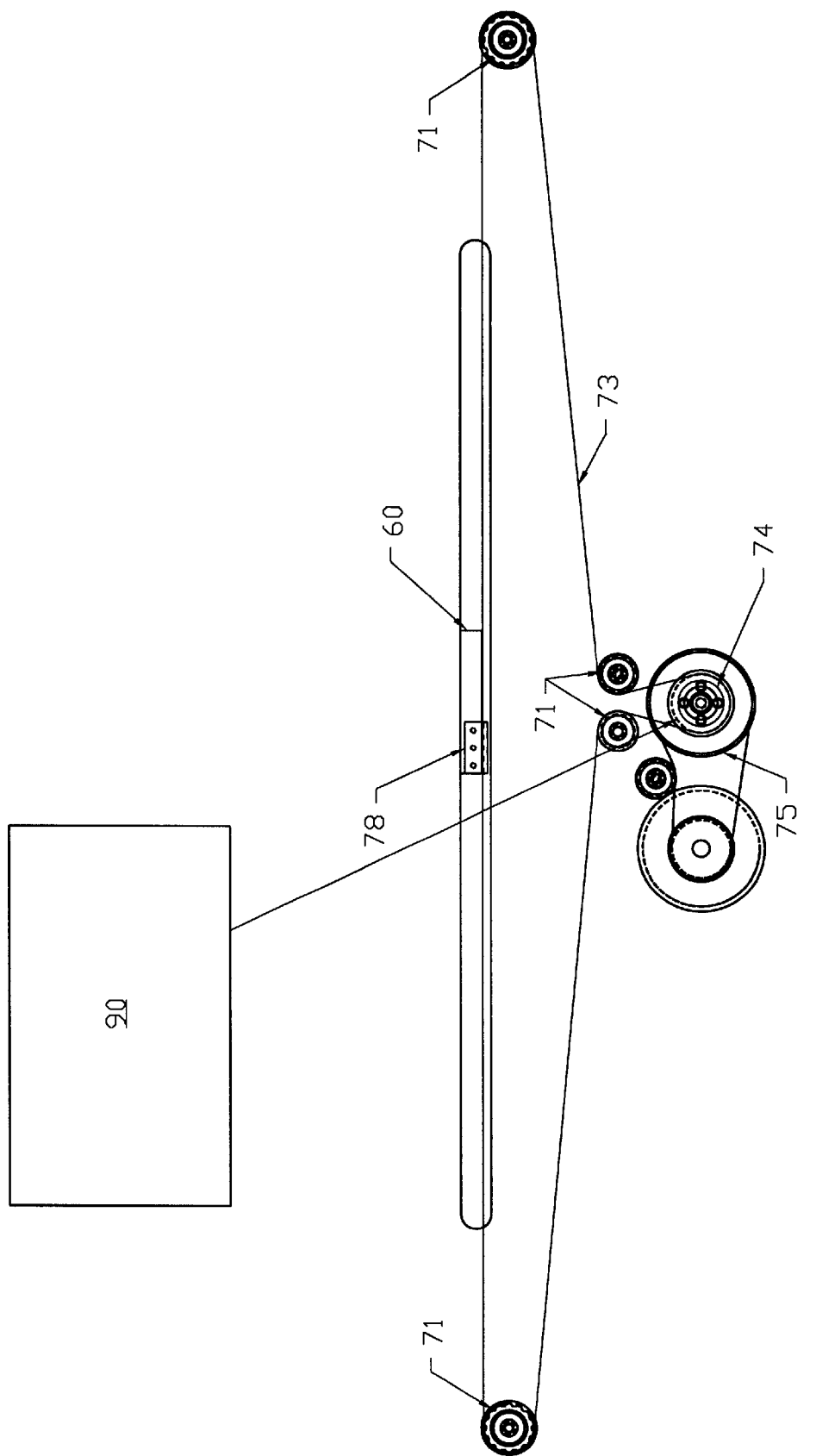
FIG. 2 is a schematic back side elevational view of he embodiment shown in FIG. 1.

Referring to FIGS. 1 and 2, there is shown an endless supply belt (10) and an endless removal belt (20) for moving articles (5) along a conveying line. The endless supply belt (10) is trained about a plurality of support belt rollers which include, but are not limited to, a first supply belt roller (31), a second supply belt roller (32), and a third supply belt roller (33), and a supply belt drive roller (34). Similarly, the endless removal belt (20) is trained about a plurality of removal belt rollers which include a first removal belt roller (41), a second removal belt roller (42), and a third removal belt roller (43), and a removal belt drive roller (44).

A first carriage (60) is mounted on a first rail (76) of the conveyor table, and a second carriage (65) is mounted a second rail (77).

A means for stabilizing the endless supply and removal belts comprises a sprocket belt (51) trained about a plurality of sprocket wheels (55).

Sensor means for detecting the articles passing on the endless supply belt (10) comprises a primary sensor (81).

The endless supply belt (10) is characterized by an upper reach (11) and an opposing lower reach (12) with a downstream end (13) and an upstream end (14). A first drive means comprises a first motor (15) for driving the supply belt drive roller (34) and circulating the endless supply belt (10).

Similarly, the endless removal belt (20) has an upper reach (21) and a lower reach (22) with a downstream end (23) and an upstream end (24). A second drive means comprises a second motor (25) which circulates the endless removal belt (20) by driving the removal belt drive roller (44).

A portion of the endless supply belt (10) continually engages the first supply belt roller (31) to form a first nose (16), while a portion of the removal belt (20) continually engages the first removal belt roller (41) to form a second nose (26). The first (16) and second (26) noses define a transfer location (61) on the first carriage (60).

The sprocket belt (51) is comprised of a first section (56) and a second section (57). Preferably, the sprocket belt (51) is a chain comprising flexibly interconnected links (58). A plurality of support blocks (52) are disposed along the first (56) and second (57) sections of the sprocket belt (51). Each support block (52) has an attaching end (54) and an outer surface (53) as shown in FIG. 3.

Referring to FIG. 2, the carriage drive means is shown to comprise a plurality of carriage rollers (71), a carriage drive roller (75), a carriage drive belt (73), and a reversible servo-motor (74). A means for attaching the first carriage (60) to the carriage drive belt (73) is a bracket (78). However, any suitable means for attaching, such as clamps, bolts or rivets could be used in lieu of the bracket.

Referring to FIGS. 1 and 3, the support blocks (52) are connected at the attaching end (54) to the links (58) of the sprocket belt (51). The outer surface (53) is opposite the attaching end (54) on each support block (52). The outer surface (53) is generally planar in shape, with approximately the same width as the widths of the endless supply belt (10) and the endless removal belt (20).

The endless supply belt (10) and the endless removal belt (20) advance the articles (5) along the conveying line. The articles (5) enter onto each belt (10, 20) at the upstream ends (14, 24) of the supply (10) and removal (20) belts, respectively, and exit at the downstream ends (13, 23) of the respective belts (10, 20). The upper reaches (11, 21) of the supply (10) and removal (20) belts support and carry the articles (5) along the conveying line. In the process, the articles (5) are moved from the endless supply belt (10) onto the endless removal belt (20) at the transfer location (61) on the upper reaches (11, 21) of the respective belts (10, 20).

The first motor (15) drives the supply belt drive roller (34) which rotates the endless supply belt (10) at a first speed, while the second motor (25) rotates the removal belt drive roller (44) to drive the endless removal belt (20) at a second speed.

Referring to FIG. 2, the first carriage (60) is driven by the reversible servo-motor (74) which rotates the associated carriage drive belt (73) via the carriage drive roller (75). The first carriage (60) moves back and forth along the first rail (76) in a direction that is generally parallel to the upper reaches (11, 21) of the supply (10) and removal (20) belts as shown in FIG. 1. Similarly, the second carriage (65) reciprocates along the second rail (77) spaced below the first rail (76), and moves generally parallel to the direction of the first carriage's movement.

Meanwhile, the sprocket belt (51) is trained around the pivotal sprocket wheels (55) which allow the sprocket belt (51) to travel freely. As the first carriage (60) is moved, it pulls the sprocket belt (51). The sprocket belt (51), in turn, moves the second carriage (65). Consequently, the sprocket belt (51) and the second carriage (65) are driven by the movement of the first carriage (60).

Moving the first carriage (60) along the first rail (76) changes the effective lengths of the upper reaches (11, 21) of the supply (10) and removal (20) belts. By shifting with the movement of the first carriage (60), the second carriage (65) changes the effective lengths of the lower reaches (12, 22) of the respective belts (10, 20). This maintains the overall tension in the respective supply (10) and removal (20) belts.

By varying the effective lengths of the supply (10) and removal (20) belts at selected speeds, the distance between articles can be increased or decreased.

The primary sensor (81) detects the articles as they move along the conveyor at a location proximate the upstream end

(14) of the supply belt (10), and sends signals to a control means such as the controller (90) indicating the positions of the articles (5).

In use, a controller (90) determines the speed and direction necessary for the first carriage (60) to move in order to create the predetermined space between respective leading and trailing articles. The controller (90) signals the servo-motor (74), and actuates the first carriage (60) thereby.

The sprocket belt (51) supports the upper reaches (11,21) of both the endless supply belt (10) and the endless removal belt (20), respectively. The outer surfaces (53) of the support blocks (52) on the sprocket belt (51) inhibit oscillations in the endless belts (10, 20) that generally occur due to the high speed at which the reciprocating carriages move. These oscillations can adversely affect the positions of the articles (5) on the belts (10, 20).

The endless supply belt (10) is trained about the supply belt rollers. The first motor (15) is attached to and drives the supply belt drive roller (34). The endless removal belt (20) is trained about the removal belt rollers. The removal belt drive roller (44) is attached to the second motor (25) and driven thereby.

The first supply belt roller (31) is positioned at the downstream end (13) of the supply belt (10) and is rotatably mounted on first carriage (60). The first removal belt roller (41) is located at the upstream end (24) of the endless removal belt (20) and is also rotatably mounted on the first carriage (60) proximate the first supply belt roller (31). Both of the first rollers (31, 41) move back and forth with the first carriage (60).

The second supply belt roller (32) and the second removal belt roller (42) are pivotally mounted on the second carriage (65) and reciprocate with the second carriage (65).

The first carriage (60) is positioned above the second carriage (65) and below the upper reaches (11, 21) of the supply (10) and removal (20) belts. When the first carriage (60) moves in a given direction, the second carriage (65) moves in the opposite direction. Since the first (16) and second (26) noses are carried by the first carriage (60), the transfer location (61) moves with the first carriage (60).

The first section (56) of the sprocket belt (51) is rigidly attached to the first carriage (60) at a first end (66), and rigidly attached at a second end (67) to the second carriage (65) as shown in FIG. 1. The second section (57) is rigidly attached at a third end (68) to the first carriage (60), and rigidly attached at a fourth end (69) to the second carriage (65).

The sprocket belt (51) is disposed between the upper and lower reaches of the supply and removal belts (10, 20) with the outer surfaces (53) of the support blocks (52) facing away from the sprocket belt (51). Being so positioned, the outer surfaces (53) are adjacent to the respective inner surfaces of the supply (10) and removal (20) belts.

Referring to the carriage drive means in FIG. 2, the carriage drive belt (73) is trained about the carriage rollers (71) and the carriage drive roller (75). The reversible servo-motor (74) is connected to the carriage drive roller (75). A bracket (78) on the first carriage (60) is fixedly secured to an upper portion of the carriage drive belt (73) and moves therewith.

In a preferred embodiment, the endless sprocket belt (51) is a chain comprised of a plurality of links (58). Each link (58) in the chain is attached to a respective support block (52). Each of the support blocks (52) has an outer surface (53) that is continuously planar.

The sprockets on the sprocket wheels (55) engage the links (58) on the chain of the endless sprocket belt (51). This engagement deters slippage between the sprocket belt (51) and the sprocket wheels (55).

In a preferred embodiment, the upper reach (11) of the supply belt (10) and the upper reach (21) of the removal belt (20) are disposed in a generally horizontal orientation. The upper flight of the endless sprocket belt (51) is generally parallel to the upper reaches (11, 21) of the belts (10, 20) and, therefore, also generally horizontal. The first (60) and second (65) carriages move back and forth on their respective first (76) and second (77) rails along lines which are generally parallel to the upper and lower reaches of the belts (10, 20). The position of the belts' upper reaches (11, 21) may vary from the horizontal, if desired. However, it is preferred that the position of the upper flight of the sprocket belt (51) and the movement of the carriages (60, 65) also be changed to remain generally parallel to the belts' upper reaches (11, 21).

The primary sensor (81) is disposed above the endless supply belt (10) near the third supply belt roller (33) at the upstream end (14) of the supply belt (10). Here the primary sensor (81) can detect the articles as they pass onto the supply belt (10) at a significant distance from the transfer location (61).

Additionally, secondary sensors (82) can be selectively positioned along the endless supply belt between the primary sensor (81) and the transfer location (61) as shown in FIG. 1. These secondary sensors (82) provide a back-up means for detecting any significant article position changes that may have occurred after the articles have passed by the primary sensor (81), but before they reach the transfer location (61).

The pressureless infeed conveyor table of the present invention can be used with an infeed control system having a control means which regulates the activity of the table to form the predetermined spacing between articles. The infeed conveyor table has reciprocating carriages (60,65) that are driven back and forth along rails (76, 77) by the reversible servo-motor (74). The carriages move back and forth to vary the effective lengths of the endless supply belt (10) and the endless removal belt (20). Generally, as each article (5) approaches the transfer location (61), the first carriage (60) moves a particular speed and direction as prescribed by a controller (90). By varying the effective lengths of the supply (10) and removal (20) belts, a predetermined spacing is established between the articles as they pass through the transfer location (61).

The endless supply belt (10) rotates at a first speed driven by the first motor (15), while the endless removal belt (20) rotates at a second speed driven by the second motor (25). The belts (10, 20) move in the same direction. The articles (5) enter the supply belt (10) at the upstream end (14) and are detected by the primary sensor (81). The primary sensor (81) transmits a signal to the controller (90) indicating the distances between the passing articles.

The articles (5) continue to move along the endless supply belt (10) towards the endless removal belt (20), while a controller (90) determines a requisite speed and direction for the first carriage (60) based on the distance between a given leading article and trailing article, as determined by the sensor (81). The speed and direction determined by the controller (90) is sent to the reversible servo-motor (74) which activates the carriage drive roller (75) and the carriage drive belt (73) to move the first carriage (60), and hence the transfer location (61).

As a trailing article approaches the transfer location (61), the movement of the first carriage (60) positions the article at the predetermined distance from the leading article. Consequently, as an article (5) passes onto the endless removal belt (20), it is positioned at the predetermined distance from its leading article. If a leading article and trailing article are already positioned at the predetermined distance apart when they pass by the sensor (81), the carriage (60) is not instructed to move when the trailing article approaches the transfer location. The endless removal belt (20) conveys the uniform column of articles (5) downstream for further processing.

This process is repeated for each article in the column entering the supply belt, as the article moves from being a leading article to being the trailing article.

The sprocket belt (51) tracks back and forth with the movement of the first carriage (60), and the outer surfaces (53) of the support blocks (52) maintain contact with the lower surfaces of the upper reaches (11, 21) to inhibit oscillations in the belts (10, 20). If unchecked, the oscillations can cause the articles to shift from their proper positions on the belts (10, 20) during conveyance. By inhibiting oscillations in the belts (10, 20), undesirable movement of articles (S) is reduced and the consistency of the predetermined spacing is better maintained.

When secondary sensors (82) are used, the controller (90) receives the signals sent from the secondary sensors (82) and makes corrections in the requisite speed and direction of the first carriage (60) for those articles that have changed positions since passing the primary sensor (81).

In a preferred embodiment of the present invention, the first carriage is directly attached to the carriage drive means. The carriage moves in direct response to activation of the reversible servo-motor and carriage drive belt. The sprocket belt is pulled along in response to the first carriage's movement. The sprocket belt moves the second carriage and inhibits oscillations in the endless supply and removal belts.

The pressureless infeed conveyor table of the present invention does not use the sprocket belt to directly drive the first carriage. Therefore, the force load on the sprocket assembly is lessened. With less loading on the sprocket assembly, a lighter sprocket belt and wheel is used, and the mass of the assembly is decreased. With less mass, the resisting inertial forces created by the sprocket assembly are diminished, thereby allowing the carriages and the sprocket assembly to move at a higher rate of speed. Consequently, this increased efficiency attributed to the carriage drive means of the present invention results in lower processing times for each article.

In addition, normal wear on the sprocket assembly is minimized by the reduction in stress placed on the sprocket assembly of the present invention. As a result, the sprocket assembly will last longer and require less maintenance. By decreasing processing downtime, the manufacturer's costs are reduced.

Although the present invention has been described in considerable detail with reference to certain preferred versions thereof, other versions are possible. Therefore, the spirit and scope of the appended claims should not be limited to the description of the preferred versions contained herein.

What is claimed is:

1. A pressureless infeed conveyor table comprising:
   an endless supply belt trained about a first supply belt roller positioned at a downstream end of the supply belt, a second supply belt roller, and a third supply belt roller positioned at an upstream end of the supply belt;
   an endless removal belt trained about a first removal belt roller positioned at an upstream end of the removal belt, a second removal belt roller, and a third removal belt roller positioned at a downstream end of the removal belt;
   first means for driving the endless supply belt at a first speed;
   second means for driving the endless removal belt at a second speed;
   a first carriage having said first supply belt roller and said first removal belt roller rotatably mounted thereon;
   a second carriage having said second supply belt roller and said second removal belt roller rotatably mounted thereon;
   transfer location comprising the first supply belt roller and the first removal belt roller where articles move from the supply belt to the removal belt;
   means for stabilizing which directly acts on the supply and removal belts;
   carriage drive means which directly drives said first carriage in a direction that is generally parallel to a direction in which the articles are conveyed;
   sensor means for detecting articles passing by on the endless supply belt.

2. The pressureless infeed conveyor table of claim 1, wherein said first means for driving the endless supply belt is a first motor connected to a supply belt drive roller which rotates said endless supply belt, and said second means for driving said endless removal belt is a second motor connected to a removal belt drive roller which rotates said endless removal belt.

3. The pressureless infeed conveyor table of claim 1, wherein said sensor means comprises a primary sensor mounted at an upstream end of said endless supply belt.

4. The pressureless infeed conveyor table of claim 3, wherein said sensor means further comprises at least one secondary sensor mounted along said endless supply belt between said primary sensor and said transfer location.

5. A pressureless infeed conveyor table for use with a controller to form a predetermined spacing between articles in a column moving along a conveying line, said pressureless infeed conveyor table comprising:
   an endless supply belt having an upper reach and a lower reach;
   a plurality of supply belt rollers comprising a first supply belt roller positioned at a downstream end of the endless supply belt and forming a first nose on the endless supply belt, a second supply belt roller, a third supply belt roller positioned at an upstream end of the endless supply belt, and a supply belt drive roller, wherein said endless supply belt is trained about said supply belt rollers;
   an endless removal belt having an upper reach and a lower reach;
   a plurality of removal belt rollers comprising a first removal belt roller positioned at an upstream end of the endless removal belt and forming a second nose on the endless supply belt, a second removal belt roller, a third removal belt roller positioned at an upstream end of the endless removal belt, and a removal belt drive roller, wherein said endless supply belt is trained about said removal belt rollers;
   a first motor is connected to the supply belt drive roller for driving the endless supply belt at a first speed;
   a second motor is connected to the removal belt drive roller for driving the endless removal belt at a second speed;

a first carriage moveably mounted on a first rail;

a second carriage moveably mounted on a second rail;

wherein said first supply belt roller and said first removal belt roller are rotatably mounted on said first carriage, and said second supply belt roller and said second removal belt roller are rotatably mounted on said second carriage;

a transfer location comprising the first nose and the second nose;

a means for stabilizing oscillations in the endless supply belt and the endless removal belt, wherein said means for stabilizing comprises a sprocket belt, and sprocket wheels;

a plurality of support blocks, each support block having an attaching end connected to the sprocket belt and an outer surface facing away from the sprocket belt, wherein the outer surface is generally planar;

wherein said sprocket belt is trained about said sprocket wheels and said outer surface is positioned proximate to the upper reach of the endless supply belt and the upper reach of the endless removal belt;

carriage drive means for driving said first carriage comprises a plurality of carriage rollers including a carriage drive roller, a carriage drive belt attached to the first carriage, and a reversible servo-motor, wherein said carriage drive belt is trained around said carriage rollers, said servo-motor drives said carriage drive roller which rotates the carriage drive belt, and said carriage drive belt is attached to said first carriage;

wherein said first carriage reciprocates in a direction that is generally parallel to the upper reach of said endless supply belt and the upper reach of said endless removal belt;

sensor means comprising at least one primary sensor positioned adjacent the upstream end of the endless supply belt;

wherein said primary sensor detects passing articles and transmits signals to the controller indicating the distance between the articles;

wherein the second carriage and sprocket belt move in response to movement of the first carriage.

6. The pressureless infeed conveyor table of claim 5, wherein said sprocket belt comprises a first and second elongated sections, said first section having a first end rigidly attached to the first carriage and a second end rigidly attached to said second carriage; and said second section having a third end rigidly attached to the first carriage and a fourth end rigidly attached to said second carriage, wherein said first carriage, sprocket belt, and second carriage form a loop.

7. A pressureless infeed conveyor device for use with a controller to form a uniform column of articles with a predetermined spacing between the articles moving in a conveying line, said device comprising:

an endless supply belt trained about a plurality of supply belt rollers which include first, second and third supply belt rollers;

an endless removal belt trained about a plurality of removal belt rollers which include first, second and third removal belt rollers, said endless removal belt positioned at a downstream end of said endless supply belt;

a first motor connected to the endless supply belt;

a second motor connected to the endless removal belt;

a first carriage with said first supply belt roller and said first removal belt roller rotatably mounted thereon;

a second carriage with said second supply belt roller and said second removal belt roller rotatably mounted thereon;

said first supply belt roller positioned at a downstream end of said supply belt and forming a first nose thereon;

said first removal belt roller positioned at an upstream end of said removal belt and forming a second nose thereon;

a transfer location comprises the first and second noses on the first carriage where the articles move from the supply belt to the removal belt;

a sprocket belt connected to the first and second carriages;

a plurality of sprocket wheels rotatably supporting said sprocket belt;

said sprocket belt trained about the sprocket wheels;

a reversible servo-motor which directly drives the first carriage via a belt drive in a reciprocating direction generally parallel to an upper reach of the endless supply belt and an upper reach of the endless removal belt; and wherein said first motor drives said endless supply belt at a first speed, and said second motor drives said endless removal belt at a second speed.

8. The pressureless infeed conveyor device of claim 1, comprising a primary sensor for detecting articles moving onto the endless supply belt, wherein said primary sensor is positioned along the endless supply belt and transmits a signal to the controller to indicate the positions of the articles on the supply belt.

9. The pressureless infeed conveyor device of claim 8, further comprising at least one secondary sensor mounted along said endless supply belt between said primary sensor and said transfer location, wherein said secondary sensor transmits a signal to the controller indicating articles passing by the secondary sensor.

10. A pressureless infeed conveyor device for use with a controller to form a uniform column of articles with a predetermined spacing between the articles moving in a conveying line, said device comprising:

an endless supply belt trained about a plurality of supply belt rollers which include first, second and third supply belt rollers;

an endless removal belt trained about a plurality of removal belt rollers which include first, second and third removal belt rollers, said endless removal belt positioned at a downstream end of said endless supply belt;

a first motor connected to the endless supply belt;

a second motor connected to the endless removal belt;

a first carriage with said first supply belt roller and said first removal belt roller rotatably mounted thereon;

a second carriage with said second supply belt roller and said second removal belt roller rotatably mounted thereon;

said first supply belt roller positioned at a downstream end of said supply belt and forming a first nose thereon;

said first removal belt roller positioned at an upstream end of said removal belt and forming a second nose thereon;

a transfer location comprises the first and second noses on the first carriage where the articles move from the supply belt to the removal belt;

a sprocket belt connected to the first and second carriages;

a plurality of sprocket wheels rotatably supporting said sprocket belt;

said sprocket belt trained about the sprocket wheels;

a reversible servo-motor which directly drives the first carriage in a reciprocating direction generally parallel to an upper reach of the endless supply belt and an upper reach of the endless removal belt; and wherein said first motor drives said endless supply belt at a first speed, said second motor drives said endless removal belt at a second speed, and said sprocket belt and said second carriage are driven by said first carriage.

11. The pressureless infeed conveyor device of claim 10, wherein said sprocket belt comprises a first and second elongated sections, wherein said first elongated section has a first end rigidly attached to the first carriage and a second end rigidly attached to said second carriage, and said second elongated section has a third end rigidly attached to said first carriage and a fourth end rigidly attached to said second carriage.

12. A pressureless infeed conveyor device for use with a controller to form a uniform column of articles with a predetermined spacing between the articles moving in a conveying line, said device comprising:

an endless supply belt trained about a plurality of supply belt rollers which include first, second and third supply belt rollers;

an endless removal belt trained about a plurality of removal belt rollers which include first, second and third removal belt rollers, said endless removal belt positioned at a downstream end of said endless supply belt;

a first motor connected to the endless supply belt;

a second motor connected to the endless removal belt;

a first carriage with said first supply belt roller and said first removal belt roller rotatably mounted thereon;

a second carriage with said second supply belt roller and said second removal belt roller rotatably mounted thereon;

said first supply belt roller positioned at a downstream end of said supply belt and forming a first nose thereon;

said first removal belt roller positioned at an upstream end of said removal belt and forming a second nose thereon;

a transfer location comprises the first and second noses on the first carriage where the articles move from the supply belt to the removal belt;

a sprocket belt connected to the first and second carriages;

a plurality of sprocket wheels rotatably supporting said sprocket belt;

said sprocket belt trained about the sprocket wheels;

a reversible servo-motor which directly drives the first carriage in a reciprocating direction generally parallel to an upper reach of the endless supply belt and an upper reach of the endless removal belt; and a plurality of carriage rollers including a carriage drive roller and a carriage drive belt trained about said carriage rollers;

wherein said first motor drives said endless supply belt at a first speed, said second motor drives said endless removal belt at a second speed, and said reversible servo-motor rotates said carriage drive roller and said carriage drive belt.

13. The pressureless infeed conveyor device of claim 12, wherein said first carriage is attached to said carriage drive belt.

14. A pressureless infeed conveyor device for use with a controller to form a uniform column of articles with a predetermined spacing between the articles moving in a conveying line, said device comprising:

an endless supply belt trained about a plurality of supply belt rollers which include first, second and third supply belt rollers;

an endless removal belt trained about a plurality of removal belt rollers which include first, second and third removal belt rollers, said endless removal belt positioned at a downstream end of said endless supply belt;

a first motor connected to the endless supply belt;

a second motor connected to the endless removal belt;

a first carriage with said first supply belt roller and said first removal belt roller rotatably mounted thereon;

a second carriage with said second supply belt roller and said second removal belt roller rotatably mounted thereon;

said first supply belt roller positioned at a downstream end of said supply belt and forming a first nose thereon;

said first removal belt roller positioned at an upstream end of said removal belt and forming a second nose thereon;

a transfer location comprises the first and second noses on the first carriage where the articles move from the supply belt to the removal belt;

a sprocket belt connected to the first and second carriages;

a plurality of sprocket wheels rotatably supporting said sprocket belt;

wherein said sprocket belt is trained about the sprocket wheels;

a plurality of support blocks, each support block having an attaching end secured to said sprocket belt and an outer surface facing away from the sprocket belt;

wherein said outer surface is generally planar;

a reversible servo-motor which directly drives the first carriage in a reciprocating direction generally parallel to an upper reach of the endless supply belt and an upper reach of the endless removal belt; and wherein said first motor drives said endless supply belt at a first speed, and said second motor drives said endless removal belt at a second speed.

15. A pressureless infeed conveyor table comprising:

an endless supply belt trained about a first supply belt roller positioned at a downstream end of the supply belt, a second supply belt roller, and a third supply belt roller positioned at an upstream end of the supply belt;

an endless removal belt trained about a first removal belt roller positioned at an upstream end of the removal belt, a second removal belt roller, and a third removal belt roller positioned at a downstream end of the removal belt;

first means for driving the endless supply belt at a first speed;

second means for driving the endless removal belt at a second speed;

a first carriage having said first supply belt roller and said first removal belt roller rotatably mounted thereon;

a second carriage having said second supply belt roller and said second removal belt roller rotatably mounted thereon;

transfer location comprising the first supply belt roller and the first removal belt roller where articles move from the supply belt to the removal belt;

sprocket assembly for stabilizing the supply and removal belts, said sprocket assembly comprises a sprocket belt and sprocket wheels, wherein said sprocket belt is attached to said first and second carriages, and is trained about said sprocket wheels;

carriage drive means for directly driving said first carriage in a direction that is generally parallel to a direction in which the articles are conveyed; and sensor means for detecting articles passing by on the endless supply belt.

16. The pressureless infeed conveyor table of claim 15, wherein said sprocket belt comprises a first and second elongated sections, wherein said first elongated section has a first end rigidly attached to the first carriage and a second end rigidly attached to said second carriage, and said second elongated section has a third end rigidly attached to said first carriage and a fourth end rigidly attached to said second carriage.

17. The pressureless infeed conveyor table of claim 15, wherein said sprocket belt and said second carriage move in response to movement of said first carriage.

18. The pressureless infeed conveyor table of claim 15, further comprising a plurality of support blocks, each support block having an attaching end secured to said sprocket belt and an outer surface facing away from the sprocket belt, wherein said outer surface is generally planar.

19. A pressureless infeed conveyor table comprising:

an endless supply belt trained about a first supply belt roller positioned at a downstream end of the supply belt, a second supply belt roller, and a third supply belt roller positioned at an upstream end of the supply belt;

an endless removal belt trained about a first removal belt roller positioned at an upstream end of the removal belt, a second removal belt roller, and a third removal belt roller positioned at a downstream end of the removal belt;

first means for driving the endless supply belt at a first speed;

second means for driving the endless removal belt at a second speed;

a first carriage having said first supply belt roller and said first removal belt roller rotatably mounted thereon;

a second carriage having said second supply belt roller and said second removal belt roller rotatably mounted thereon;

transfer location comprising the first supply belt roller and the first removal belt roller where articles move from the supply belt to the removal belt;

means for stabilizing the supply and removal belts;

a carriage drive belt;

a plurality of carriage rollers;

a reversible servo-motor; and sensor means for detecting articles passing by on the endless supply belt;

wherein said carriage drive belt is attached to said first carriage, trained about said carriage rollers, and driven by said reversible servo-motor, such that said carriage drive belt directly drives said first carriage in a direction that is generally parallel to a direction in which the articles are conveyed.

20. The pressureless infeed conveyor table of claim 9, wherein said first carriage is attached to an upper section of said carriage drive belt.

* * * * *

UNITED STATES PATENT AND TRADEMARK OFFICE
CERTIFICATE OF CORRECTION

PATENT NO.   : 6,305,525 B1
DATED        : October 23, 2001
INVENTOR(S)  : Miller et al.

Page 1 of 1

It is certified that error appears in the above-identified patent and that said Letters Patent is hereby corrected as shown below:

<u>Column 7,</u>
Line 24, "(S)" should read -- (5) --.

<u>Column 10,</u>
Line 26, change "1" to -- 7 --.

<u>Column 14,</u>
Line 30, change "9" to -- 19 --.

Signed and Sealed this

Fourteenth Day of May, 2002

*Attest:*

JAMES E. ROGAN
*Attesting Officer*    *Director of the United States Patent and Trademark Office*